(12) United States Patent
Gautron et al.

(10) Patent No.: US 8,508,733 B2
(45) Date of Patent: Aug. 13, 2013

(54) METHOD FOR ESTIMATING LIGHT SCATTERING

(75) Inventors: Pascal Gautron, Cesson Sevigne Cedex (FR); Jean-Eudes Marvie, Cesson Sevigne Cedex (FR); Cyril Delalandre, Cesson Sevigne Cedex (FR)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/511,072

(22) PCT Filed: Nov. 18, 2010

(86) PCT No.: PCT/EP2010/067727
§ 371 (c)(1),
(2), (4) Date: May 21, 2012

(87) PCT Pub. No.: WO2011/064132
PCT Pub. Date: Jun. 3, 2011

(65) Prior Publication Data
US 2012/0229806 A1    Sep. 13, 2012

(30) Foreign Application Priority Data
Nov. 24, 2009 (FR) .................................. 09 58288

(51) Int. Cl.
*G01N 21/00* (2006.01)

(52) U.S. Cl.
USPC .......................................... 356/337; 356/341

(58) Field of Classification Search
USPC ................... 356/335–343; 250/339.11, 335, 250/339.06, 339.01, 338.1, 336.1
See application file for complete search history.

(56) References Cited

U.S. PATENT DOCUMENTS 5,281,951 A * 1/1994 Okayama ..................... 340/511
5,962,852 A * 10/1999 Knuettel et al. ......... 250/339.11

OTHER PUBLICATIONS

Cerezo et al., "A Survey on Participating Media Rendering Techniques", Visual Computer 2005, vol. 21, No. 5, Jun. 1, 2005, pp. 303-328.
Tokuyoshi et al., "A Fast Rendering Method for a Scene with Participating Media of Anisotropic Scattering Property", Proceedings of Computer Graphics International 2005, 2005 IEEE, Stony Brook, NY, Jun. 22-24, 2005.
Search Report Dated May 10, 2011.

* cited by examiner

*Primary Examiner* — Tri T Ton
(74) *Attorney, Agent, or Firm* — Robert D. Shedd; Richard LaPeruta (57) ABSTRACT

The invention relates to a method for estimating the quantity of light scattered by a heterogeneous participating media. In order to optimise the display while minimising the required calculation time, the method comprises steps for selecting at least one level of spatial subdivision of said media from among a plurality of hierarchic levels of spatial subdivision according to at least one item of error information representative of an attenuation difference in said media according to at least one direction between two consecutive hierarchic levels, and estimating the quantity of light scattered by sampling of said media along at least one scattering direction, the sampling being a function of at least one selected spatial subdivision level.

16 Claims, 7 Drawing Sheets

METHOD FOR ESTIMATING LIGHT SCATTERING

This application claims the benefit, under 35 U.S.C. §365 of International Application PCT/EP2010/067727, filed Nov. 18, 2010, which was published in accordance with PCT Article 21(2) on Jun. 3, 2011 in French and which claims the benefit of French patent application No. 0958288 filed Nov. 24, 2009.

1. DOMAIN OF THE INVENTION

The invention relates to the domain of synthesis image composition and more specifically to the domain of light scattering simulation in a heterogeneous participating media. The invention is also understood in the context of special effects for a live composition.

2. PRIOR ART

According to the prior art, different methods exist for simulating the scattering of light in participating media such as for example fog, smoke, dust or clouds. Participating media correspond to media composed of particles in suspension that interact with the light modifying particularly the trajectory and intensity.

Participating media can be broken down into two groups, namely homogenous media such as water and heterogeneous media, such as smoke or clouds. In the case of homogenous participating media, it is possible to calculate analytically the attenuation of the light transmitted by a light source. In fact, due to their homogenous nature, these media have parameters such as the light absorption coefficient or the light scattering coefficient that are constant at any point of the media. Conversely, the light absorption and scattering properties vary from one point to another in a heterogeneous participating media. The calculations required to simulate the scattering of light in such a heterogeneous media are then very costly and it is thus not possible to calculate analytically and live the quantity of light scattered by a heterogeneous participating media. In addition, the media not being scattered the quantity of light scattered by the media also varies according to the scattering direction of the light, that is to say the direction in which a person views the media. Calculations estimating the quantity of light scattered must then be reiterated for each observation direction of the media by a person in order to obtain a realistic display of the media.

To produce the live display of heterogeneous participating media, some methods perform the pre-calculation of some parameters representative of the heterogeneous participating media. Though these methods are perfectly adapted for a studio use in post-production for example, and provide a good quality display, these methods are not adapted in the context of live interactive conception and composition of a heterogeneous participating media. Other methods such as the ray-marching algorithm method well known to those skilled in the art (described for example in the document entitled "Radiative Transfer Equation" by S. Chandrasekhar, published in 1960 in Dover Publications) consist in sampling the heterogeneous participating media according to a scattering direction and/or a transmission direction of the light to estimate the attenuation of the light in a number of points of the media, the number of points depending on the precision of the sampling. Such sampling can be very costly in calculations, particularly when it is very fine and/or when the sampled media is complex and/or extensive.

With the emergence of interactive simulation games and applications, notably in three dimensions (3D), the need is being felt for live simulation methods offering a realistic display of heterogeneous participating media.

3. SUMMARY OF THE INVENTION

The purpose of the invention is to overcome at least one of these disadvantages of the prior art.

More specifically, the purpose of the invention is notably to optimise the required calculation time to compose a realistic display of the scattering of light in a heterogeneous participating media.

The invention relates to a method for estimating the quantity of light scattered by a heterogeneous participating media, the method comprising steps for:
  selecting at least one level of spatial subdivision of the media from among a plurality of hierarchic levels of spatial subdivision according to at least one item of error information representative of an attenuation difference in the media according to at least one direction between two consecutive hierarchic levels,
  estimating the quantity of light scattered by sampling of said media along at least one scattering direction, the sampling being a function of the at least one selected spatial subdivision level.

Advantageously, the method comprises a step of estimating at least a first value representative of the attenuation of the light scattered by at least one point of the media situated along said at least one scattering direction.

According to a particular characteristic, the method comprises a step of estimation of at least a second value representative of the attenuation of the light received from at least one light source according to at least one emission direction of the light in the at least one point situated along the at least one scattering direction.

Advantageously, the at least one item of error information is determined by comparison of two first values, the two first values being estimated respectively for two consecutive hierarchic spatial subdivision levels of the media.

According to another characteristic, the at least one item of error information is determined by comparison of two second values, the two second values being estimated respectively for two consecutive hierarchic spatial subdivision levels of the media.

According to a specific characteristic, the method comprises a step of comparison of error information with a threshold value, Advantageously, the spatial subdivision level selected corresponds to the highest hierarchic position level if the at least one item of error information is less than the threshold value.

4. LIST OF FIGURES

The invention will be better understood, and other specific features and advantages will emerge upon reading the following description, the description making reference to the annexed drawings wherein.

5. DETAILED DESCRIPTION OF EMBODIMENTS OF THE INVENTION

Figure 1:
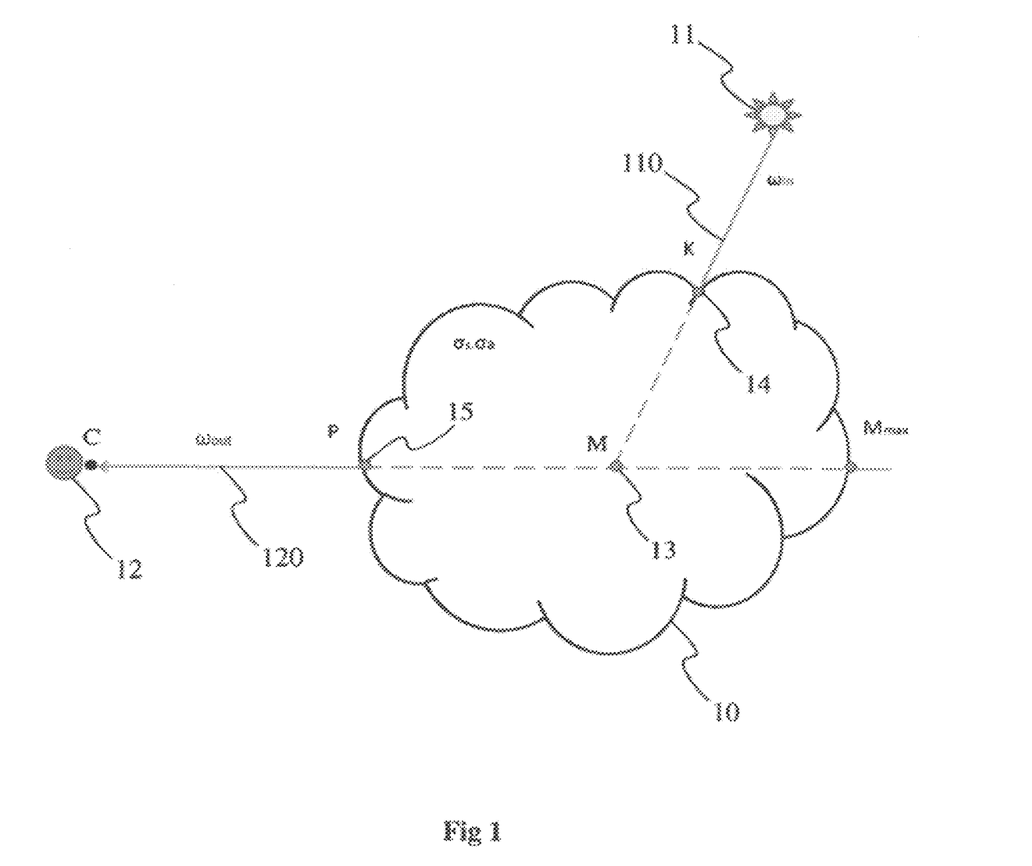
FIG. 1 diagrammatically shows a heterogeneous participating media scattering light, according to a particular embodiment of the invention.

FIG. 1 shows a heterogeneous participating media 10, for example a cloud. A participating media is a media, composed of a multitude of particles in suspension, which absorbs, emits and/or diffuses light. In its simplest form, a participating media absorbs only light, for example the light received from a light source 11 such as the sun for example. This means that the light passing across the media 10 is attenuated, the attenuation depending of the density of the media. The media being heterogeneous, that is to say that the physical characteristics of the media, such as the density of particles composing it for example, vary from one point to another in the media. As the participating media is composed of small particles that interact with the light, the incident light, that is to say received from the light source 11 according to one direction $\omega_{in}$ 110 is not only absorbed but it is also scattered. In an isotropic scattering participating media, the light is scattered uniformly in all directions. In an anisotropic scattering participating media, such as the cloud 10 shown in FIG. 1, the light scattering depends on the angle between the incidence direction $\omega_{in}$ 110 and the scattering direction $\omega_{out}$ 120 of the light. The quantity of light scattered at a point M 13 of the media 10 in the scattering direction $\omega_{out}$ 120 is calculated by the following equation:

$$Q(M,\omega_{out}) = D(M) \cdot \sigma_S \cdot p(M,\omega_{out},\omega_{in}) \cdot L_{ri}(M,\omega_{in}) \qquad \text{Equation 1}$$

The quantity of light scattered by a point M 13 of the media attaining the eye of the spectator 12 situated at a point C of space in the direction $\omega_{out}$ 120, that is to say the quantity of light scattered by the point M is attenuated by the media 10 on the trajectory M-P, the point P being situated at the intersection of the media 10 and the direction $\omega_{out}$ in the direction of the spectator 12, is then $$L_p(M,\omega_{out}) = Q(M,\omega_{out}) \cdot \exp^{\int_P^M -D(s) \cdot \sigma_t ds} \qquad \text{Equation 2}$$

wherein:
- $\sigma_s$ is the scattering coefficient of the media,
- $\sigma_a$ is the absorption coefficient of the media,
- $\sigma_t = \sigma_s + \sigma_a$ is the extinction coefficient of the media,
- D(M) is the density of the media at a given point, the density varying from one point to another as the media 10 is heterogeneous,
- $p(M,\omega_{out},\omega_{in})$ is the phase function describing how the light coming from the incidence direction $\omega_{in}$ is scattered in the scattering direction $\omega_{out}$ at the point M,
- $L_{ri}(M,\omega_{in})$ is the reduced light intensity at the point M coming from the incidence direction $\omega_{in}$ 110 and represents the quantity of incident light arriving at the point M after attenuation due to the trajectory of the light in the media 10 on the segment K-M, K being the intersection point between the media 10 and the incidence ray $\omega_{in}$ 110, and its value is:

$$\exp^{\int_M^K -D(s) \cdot \sigma_t ds} \qquad \text{Equation 3}$$

$\exp^{\int_M^K -D(s) \sigma_t ds}$ represents the attenuation of scattered light due to the absorption and scattering along the path from P 15 to M 13, Equation 2 enables the quantity of light scattered by a point M and attaining the eye of a spectator 12 situated on the direction $\omega_{out}$ to be calculated. To calculate the quantity of light received by a spectator looking in the direction $\omega_{out}$, the sum of all the contributions of the set of points of the media situated on the axis $\omega_{out}$ must be calculated, that is to say the points situated on the segment P-$M_{max}$, P and $M_{max}$ being the two intersection points between the media 10 and the direction $\omega_{out}$ 120. This total scattered light arriving at P 15 from the direction $\omega_{out}$ 120 due to simple scattering is then:

$$L(P,\omega_{out}) = \int_P^{M_{max}} L_p(M,\omega_{out}) dM \qquad \text{Equation 4}$$

It is considered here that the light covering the trajectory C-P is not attenuated, the light not being attenuated outside the media 10.

This total scattered light is obtained by integration of contributions from all the points situated between P and $M_{max}$ on a ray having $\omega_{out}$ as direction. Such an integral equation cannot be resolved analytically in general and even less so for a live estimation of the quantity of light scattered. The integral is evaluated digitally using the method known as ray-marching. In this method, the integration domain is discretized into a multitude of intervals of size $\delta_M$, for which the density varies from one interval to another, and the following equation is obtained:

$$L(P, \omega_{out}) \approx \sum_P^{M_{max}} L_p(M, \omega_{out}) \delta_M \qquad \text{Equation 5}$$

Similarly, the attenuation of the light from a light source 11 in the heterogeneous participating media 10 is advantageously calculated by application of the ray-marching method. Thus, the attenuation of the light intensity at the point M $Att_L(M)$ 13 representing the quantity of incident light arriving at the point M after attenuation is represented by the following equation;

$$Att_L(M) = \exp^{\int_M^K -D(s) \sigma_t ds} \qquad \text{Equation 6}$$

To estimate the attenuation of light at the point M according to the ray-marching method, the integration domain situated on the incidence direction 110 considered between the input point K 14 of the light ray 110 in the media 10 and a point M 13 considered of the media 10 is discretized into a series of intervals of size $\delta_S$, Moreover, the density also varies from one point to another (or in other words from one interval $\delta_S$ to another) along the incidence direction (also called the light emission direction). The following equation is thus obtained:

$$Att_L(M) \approx \prod_K^M \exp^{-D(s)\sigma_t \delta_s} \qquad \text{Equation 7}$$

Advantageously, the heterogeneous participating media 10 is a three-dimensional element, shown in two dimensions on FIG. 1 for reasons of clarity.

According to a variant, the media 10 is lit by a plurality of light sources, for example 1000, 100,000 or 1,000,000 light sources, the light sources forming a light environment. The estimation of the light from several remote light sources is carried out using the environment mapping method known to those skilled in the art. According to the environment mapping method, it is considered that all the light sources of the light environment are situated at optical infinity with respect to points of the media 10. It is thus possible to consider that the directions taken are identical whatever the points considered of the media. The parallax effect due to the distance separating different points of the media is thus negligible. According to this variant, to estimate the attenuation of the incident light at a point M, it is necessary to calculate the attenuation of the light via the equation 7 for a set of incidence directions representative of the light environment, which significantly increases the calculations.

According to another variant, the physical characteristics of the media 10, such as the scattering coefficient $\sigma_s$ of the media and/or the absorption coefficient $\sigma_a$ of the media, also vary from one point to another in the media 10, as does the density. According to an additional variant, only one of the two or both coefficients $\sigma_s$ and $\sigma_a$ vary in the media, the density being homogeneous in the media.

Figure 2A:
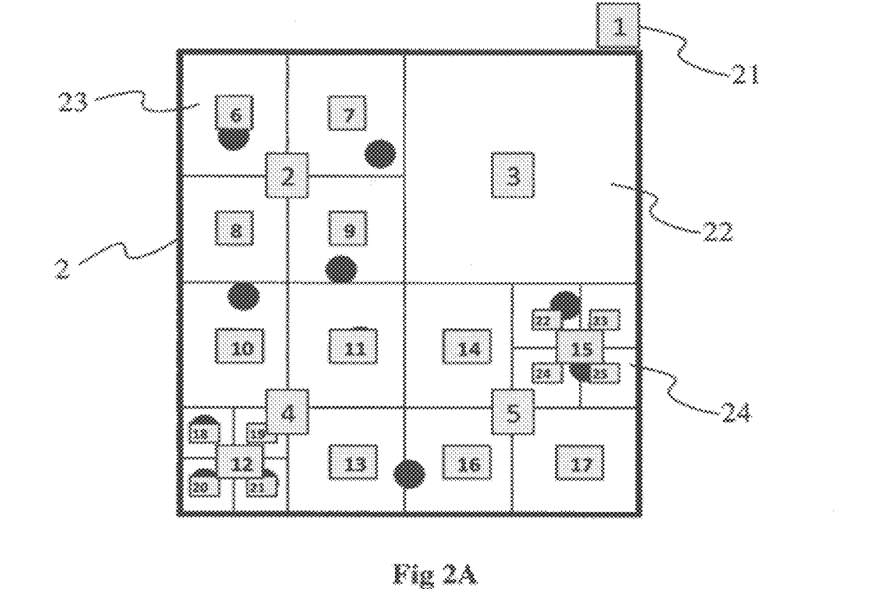
FIGS. 2A and 2B show two representations of a spatial subdivision tree of a media of FIG. 1, according to a particular embodiment of the invention.
Figure 2B:
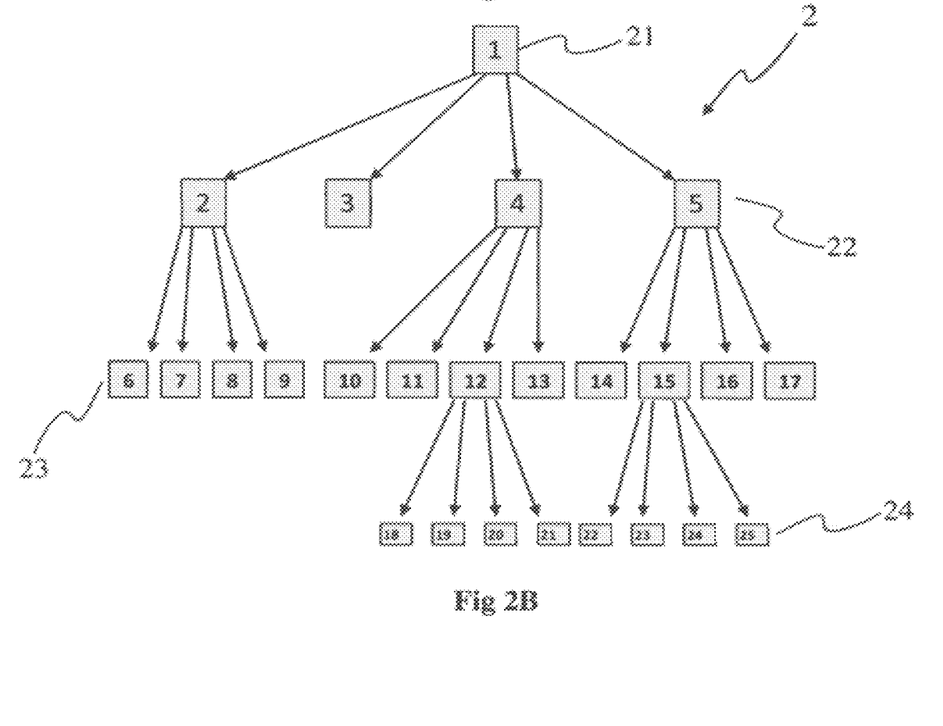

FIGS. 2A and 2B show a spatial subdivisions tree of the media 10 according to two different modes of representation, according to a particular embodiment of the invention.

For reasons of clarity and simplicity, the media 10 is represented by a simple two dimensional geometric form 2 (called media 2 in the description of FIGS. 2A and 2B) such as a square or rectangle in FIG. 2A. The surface of the media 2 is subdivided hierarchically into cells of identical size to form a "quadtree" type structure. The points of the media 2 belonging to a same cell have identical physical characteristics, for example the density of the media is the same at each point of the media 2 of a same cell. The physical characteristics vary advantageously from one cell to another. According to a variant, the physical characteristics of some cells of the media 2 have identical physical characteristics, the media 2 remaining globally heterogeneous, that is to say that at least two cells have different physical characteristics. The highest hierarchical level is represented by a single cell [1] forming the first level 21 of spatial subdivision of the media 2, this unique cell having the same surface as that of the media 2. The hierarchical level immediately below the first level (called second level 22 of spatial subdivision of the media 2) is represented by four cells [2], [3], [4] and [5] of identical size corresponding to a quarter of the size of the cell [1]. The third level 23 of spatial subdivision of the media 2, of lower hierarchical level and following the second level 22, is represented by 16 cells of identical size, for example the cells [6] to [17]. The size of each of the cells [6] to [17] corresponds to a quarter of the size of the cells [2] to [5], each cell [2] to [5] having been respectively divided into four cells of identical size. The fourth level 24 of spatial subdivision of the media 2, of lower hierarchical level and following the third level 23, is represented by 64 cells of identical size, for example the cells [18] to [25]. The size of each of the cells [18] to [25] corresponds to a quarter of the size of the cells [6] to [17], each cell of the third level 23 [6] to [17] having been respectively divided into four cells of identical size. To generalise this structure, to form a level V of spatial representation directly less than level X, this means multiplying by four the number of cells of level X to obtain the number of cells forming level Y.

This hierarchy of levels appears more clearly in regard of FIG. 2B wherein the hierarchic levels of spatial subdivisions appear in the form of a tree structure, the cells forming nodes of the tree. The first level 21 of the spatial subdivision of the media 2 comprises a single cell [1]. The second level 22 of spatial subdivision of the media 2 (of lower hierarchical position than the first level) comprises four times more cells than the first level, or 4 cells [2] to [5]. The third level 23 of spatial subdivision of the media 2 (of lower hierarchical position than the second level) comprises four times more cells than the second level, or 16 cells [6] to [17]. The fourth level 24 of spatial subdivision of the media 2 (of lower hierarchical position than the third level) comprises four times more cells than the third level, or 64 cells [18] à [25], the cells [18] à [21] corresponding for example to a subdivision of the cell [12] of the third level of cells [22] a [25] corresponding for example to a subdivision of cell [15] of the third level. A fifth level of spatial representation of the media 2 (not shown in FIGS. 2A and 2B) thus would contain four times more cells than the fourth level, a sixth level of spatial representation of the media 2 (not shown in FIGS. 2A and 2B) thus would contain four times more cells than the fifth level and so on.

When the participating heterogeneous media 10 in a three-dimensional element, the media 2 is itself also a three dimensional element and the media is subdivided hierarchically into cells of identical dimensions and thus of identical volume to form an "octree" type structure. Cells of identical dimensions (and volumes) forming the media 2 are advantageously called "voxels", a "voxel" corresponding to a volume element. In the case of a three-dimensional media 2, the first level of spatial subdivision (the highest hierarchical position) comprises a single "voxel" for which the volume is equal to a volume of the media 2. The second spatial subdivision level comprises 8 "voxels" of identical dimensions (and volume), the third spatial subdivision comprises 8 times more "voxels" as the second level, or 512 volumes and so on. The points of a same "voxel" have identical physical characteristics, that is to say they have the same absorption coefficient, the same scattering coefficient and the same density, the volume inside a "voxel" being as a consequence homogenous. Advantageously, the physical characteristics of points belonging to a first "voxel" are different from the physical characteristics of points belong to a neighbouring "voxel" of the first "voxel", for example the points of the first "voxel" having a density $D_1$ different from points of neighbouring "voxels". According to a variant, the "voxels" of the media 2 have different characteristics from each other. According to another variant, some "voxels" of the media 2 have identical physical characteristics, The media 2 remain overall heterogeneous, even if some "voxels" that compose it have identical physical characteristics for example an identical Density $D_i$.

In the remainder of the description, the term "voxel" will be used to designate a spatial subdivision element of the media 2, even if the spatial subdivision element is represented by a cell in two dimensions for reasons of clarity in the figures. For a two-dimensional element, the term cell will be substituted with the term "voxel", the reasoning described applies in the same way to a cell and a "voxel", The density values are first calculated according to any method known to those skilled in the art, for example using a fluid dynamic simulation application or by somebody hoping to create an effect of a particular display for the media 10, in all points of the media 10 to represent the media 10, this density value being called initial density of a point. The density value assigned to the points belonging to a "voxel" is then calculated to correspond to the average of initial densities previously calculated from each of the points constituting the "voxel". For example, for the first level of spatial subdivision (the highest hierarchically) in which there is a single "voxel", the density value assigned to all the points of the "voxel" corresponds to the average value of initial densities of the media 2. For the second level in which the media 2 is subdivided into 8 "voxels", the average density of points is calculated using the average of initial densities of points belonging to a "voxel", this average value is assigned to all the points of the "voxel" considered and the operation is reiterated for the seven other "voxels". The same reasoning is applied for each level of the spatial subdivision of the media 2.

Calculating the average of the initial density of points of a "voxel" to assign this average value to all points forming a "voxel" involves introducing a density estimation error, the error being greater as the spatial subdivision of the media 2 is rough, that is to say the error is greater as the number of "voxels" forming the media 2 is small. The density estimation error between two hierarchically consecutive levels of spatial subdivision is calculated using for example the following formula:

$$D_{err} = \frac{1}{8}\sum_{i=1}^{8}(|D_{n+1,i} - D_n|) \quad \text{Equation 8}$$

where $D_{err}$ represents the density estimation error of a hierarchic level n with respect to the lower hierarchic level (n+1), $D_{n+1,i}$ represents the average density of points of a "voxel" i of a hierarchic level (n+1) directly below the hierarchic level n, Dn represents the average density of points of the "voxel" represented by a node of a level n of spatial subdivision that breaks down into 8 "voxels" at the lower level (n+1).

As a reminder, the attenuation of the light crossing a "voxel" is provided by the following formula:

$$Att = \exp\int_{x=x_{min}}^{x=x_{max}} -\sigma_t D(x)dx \quad \text{Equation 9}$$

where $x_{min}$ and $x_{max}$ correspond respectively to the first point and the second point of intersection of a light scattering or emission direction with the "voxel" considered of the spatial subdivision level n, D represents the density.

Considering the density error calculated by formula 8 for example, the lower and higher limits of attenuation in a "voxel" are deduced:

$$Att_{min} = \exp\int_{x=x_{min}}^{x_{max}} -\sigma_t D(x)(1-D_{err})dx \quad \text{Equation 10}$$

$$Att_{max} = \exp\int_{x=xmin}^{x_{max}} -\sigma_t D(x)(1+D_{err})dx \quad \text{Equation 11}$$

FIGS. 3A, 3B, 4A and 4B show several spatial subdivision levels of a media 10 of FIG. 1 according to a scattering direction of the light, according to a particular embodiment of the invention. FIGS. 3A, 3B, 4A and 4B also illustrate a method for selection of a spatial subdivision level of the media 2 (representing the media 10 according to a simple geometric form) along one scattering direction of the light $\omega_{out}$ 120, according to a particular embodiment of the invention.

Figure 3A:
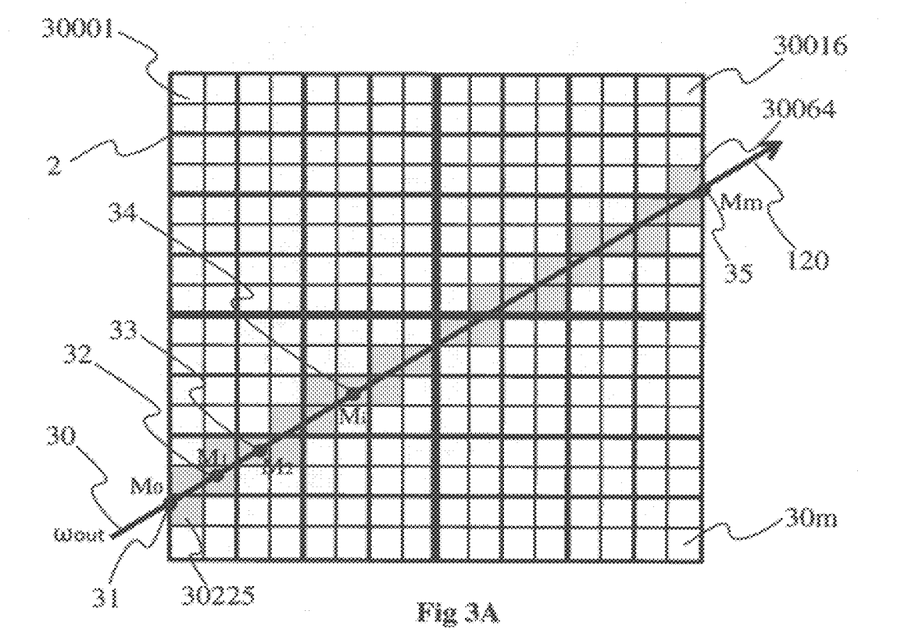
FIGS. 3A, 3B, 4A and 4B show several spatial subdivision levels of a media of FIG. 1 according to a scattering direction of the light, according to a particular embodiment of the invention.

FIG. 3A is a representation in two dimensions of the lowest spatial subdivision level of the media 2, corresponding for example to level 24 or to a lower level shown in FIG. 26. The media 2 is composed of n voxels 30001 to 30n, The "voxels" crossed by the light scattering direction $\omega_{out}$ 120, for example the "voxels" 30225 and 30064, appear shaded in FIG. 3A. The part on the right representing the scattering of the light $\omega_{out}$ crossing the media 2 is sampled into a set of m points $M_0$ 31, $M_1$ 32, $M_2$ 33 ... $M_i$ 34 ... $M_m$ 35 for the estimation of the attenuation of the light along this scattering direction using the method known as ray-marching.

Figure 3B:
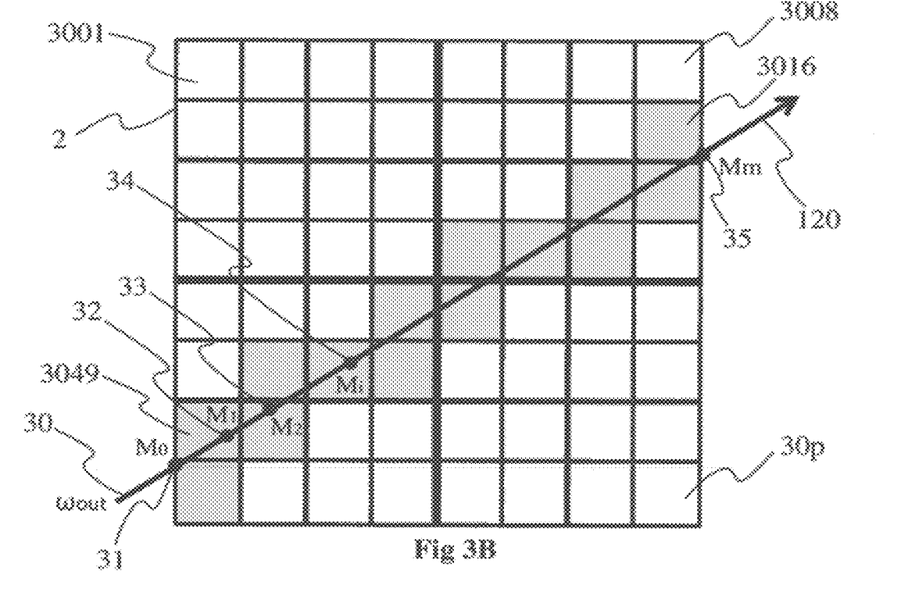

FIG. 3B is a two-dimensional representation of the spatial subdivision level hierarchically immediately above the spatial subdivision level shown in FIG. 3A, for example level 23 if FIG. 2A represent level 24. The media 2 thus shown comprises p "voxels" 3001 to 30p, each "voxel" of FIG. 2B corresponding to the merging of 8 "voxels" of FIG. 2A, these 8 "voxels" being connected to the "voxel" hierarchically above them in the octree representing the tree structure of spatial subdivision levels of the media 2. The "voxels" crossed by the scattering direction $\omega_{out}$ 120, for example the "voxels" 3049 and 3016, also appear shaded. The elements that are common to FIGS. 3A and 3B have the same reference signs, for example the set of m points $M_0$ 31, $M_1$ 32, $M_2$ 33 ... $M_i$ 34 ... $M_m$ 35 forming the sampling of the direction $\omega_{out}$ 120.

To select the level of spatial subdivision forming the best compromise between calculation speed/accuracy of estimation of the quantity of light scattered, that is to say the level of spatial subdivision highest hierarchically for which the error induced for the estimation of the quantity of light scattered is acceptable in terms of display (that is to say for example not visible to the human eye), the quantity of light scattered via the point $M_0$ 31 is estimated initially by using the method described with respect to FIG. 1, that is to say by calculating the attenuation of the incident light at the point $M_0$, with the lowest hierarchically level of spatial subdivision, that is to say that described with respect to FIG. 2A. This calculated value forms the first reference value of quantity of light scattered. Secondly, the quantity of light scattered via the point $M_1$ 32 is calculated according to the same method (after calculation of the attenuation of the incident light at the point $M_1$) with the lowest level of spatial subdivision hierarchically. The attenuation light between $M_1$ and $M_0$ is then calculated from this value in order to estimate the total quantity of light scattered via $M_1$ and $M_0$ at the point $M_0$, the attenuation value depending on the density and thus the "voxels" crossed according to equations 6 and 9. Thirdly, the quantity of light scattered via the point $M_1$ 32 is calculated according to the same method with the level of spatial subdivision immediately higher hierarchically than the lowest level, that is to say the level represented with respect to FIG. 2B. Then is calculated using this value the attenuation of the light between $M_1$ and $M_0$ in order to estimate the total quantity of light scattered via $M_1$ and $M_0$ at the point $M_0$, this attenuation value being different from that calculated secondly as the "voxels" crossed between $M_0$ et $M_1$ are not the same from one level of spatial subdivision to the next hierarchically highest level of spatial subdivision. By comparing the quantity values of total light scattered via the points $M_1$ and $M_0$ at the point $M_0$ for the two consecutive spatial subdivisions, a value is obtained representative an error linked to the representation difference of the media 2 (that is to say via different consecutive spatial subdivision levels). This value representative of the error is finally compared to a threshold value, this threshold value being for example representative of an admissible fault as it s not visible to the human eye. If the error is less than the threshold value, this means that the highest spatial subdivision level has been selected as it introduced little error for the estimation of the quantity of light scattered while reducing the calculations, the "voxels" being of greater size and the density varying thus less often in the media 2, which reduces the calculations of attenuation of the light for which the complexity depends directly on the density variation.

Figure 4A:
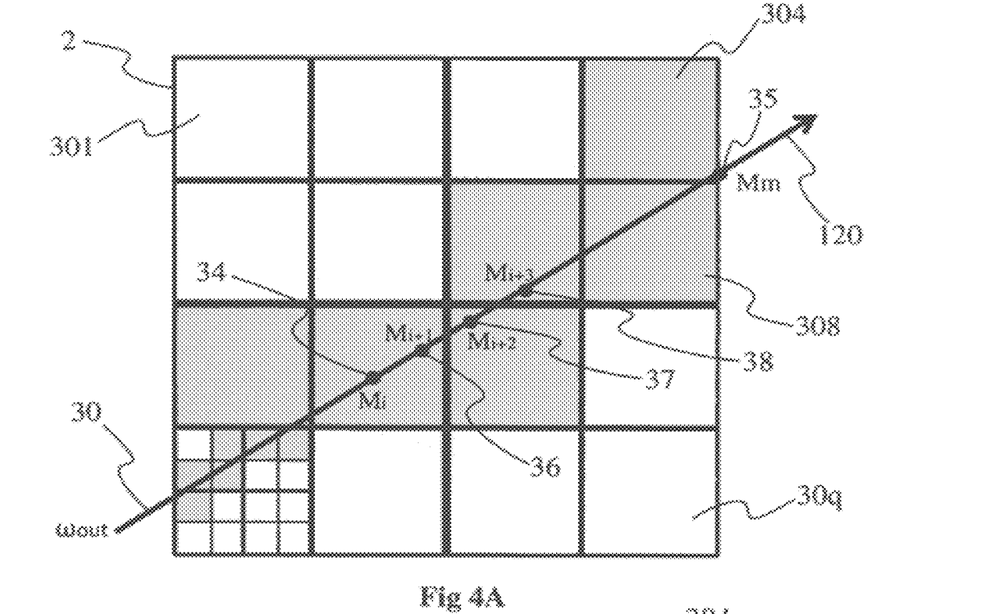
Figure 4B:
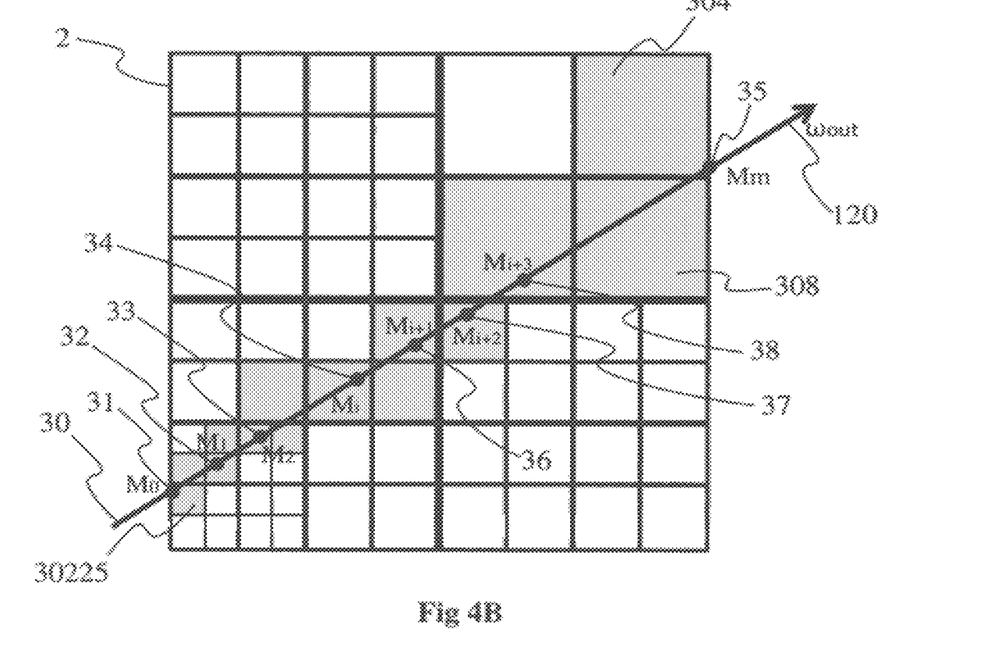

If the error is greater than the threshold value, this means that the lowest spatial subdivision level has been selected, that is to say with the most "voxels", as this means that the higher hierarchical level results in too great an error, for example visible to the human eye. The same calculations are then carried out for the next point $M_2$ 33. The quantity of light scattered via the point $M_2$ is calculated for the lowest spatial subdivision level, then the light attenuation on the path $M_2 M_0$ is calculated to estimate the quantity of light scattered via $M_2$ at the point $M_0$ for the lowest spatial subdivision level. The reference value to which the quantity of light scattered via $M_2$ at the point $M_0$ is compared is the quantity of light scattered by the points situated upstream from $M_2$ on the direction 120, namely the points $M_0$ and $M_1$. Then the quantity of light scattered via $M_2$ at the point $M_0$ is estimated in the same way for the level of spatial subdivision directly higher hierarchically, namely that shown in FIG. 26, This quantity of light is in its turn compared with the reference constituted by the quantity of light scattered via the points $M_0$ and $M_1$ for the lowest spatial subdivision level, namely that of FIG. 2A. By comparing the quantity of light scattered via M2 with the quantity of light scattered via M0 and M1 for two consecutive levels of spatial subdivision, an estimation error representative of an estimated attenuation difference for each of the two levels is determined. If this error is less than the threshold value, this means that the highest level of subdivision is sufficient for correct estimation. Otherwise, if this error is greater than the threshold value, the highest level of subdivision is insufficient and the finest level of subdivision should be conserved, namely the least high of the two hierarchically and the same operations are to be carried out for the next point $M_i$ 34. If the least fine subdivision level is sufficient for $M_i$, then it is sufficient for all of the points situated downstream of $M_i$ on the scattering direction as far as $M_m$. In fact the further you go into the media 2, the greater the attenuation of the light scattered via the points and the less the quantity of light scattered by these points is great with respect to the total quantity of light scattered in $M_0$. If the error is admissible for a point $M_i$, it is thus also all the more admissible for a point $M_{i+1}$ situated downstream towards $M_m$. This is shown in FIG. 4B wherein it can be seen that for the points M0 to M2, the lowest hierarchical level is selected though the next points of higher hierarchical levels are selected. If for Mi the hierarchical level immediately above the lowest level is sufficient to obtain an estimation of the quantity of light scattered with an acceptable margin of error, the question that is asked is if the next highest hierarchical level is itself also sufficient. This is shown in FIG. 4A. For the points $M_i$ 34 then $M_{i+1}$ 36 then $M_{1+2}$ 37 then $M_{i+3}$ 38, the quantity of light scattered via the point considered to the point MO for the level of subdivision represented in FIG. 3B is compared to the quantity of light scattered via the points situated upstream with the level of subdivision selected for these points. Then for these same points, one after the other, the quantity of light scattered via these points to the point $M_0$ for a consecutive higher level of subdivision, for example level 22 (if level 23 is represented in FIG. 2B) is itself also compared with the same reference value representing the quantity of light scattered at the point $M_0$ via the upstream points, An item of error information representative of the attenuation difference of the light between two consecutive subdivision levels is deduced from it. For the points for which this error is greater than a threshold value, this signifies that the highest subdivision level of the two is insufficient for a correct estimation of the quantity of light scattered. When for a point this error is less than a threshold value, then at this point the highest subdivision level is sufficient and it will be selected as being less costly in terms of power and/or calculation time required for the-estimation of the attenuation of the light, the density variations from one point to another being less numerous than for a lower subdivision level hierarchically. For the points following this last point (that is to say the first point for which the error is less than the threshold value), the highest level of subdivision will also be sufficient and the question is then posed to discover if the hierarchically higher level of subdivision is also sufficient, and this until arriving at the point $M_m$ 35 at the limit of the media 2 in the direction $\omega_{out}$ 120.

In this way we arrive at the representation of FIG. 4B where the level of spatial subdivision is hierarchically higher as we go further into the media 2 along the direction $\omega_{out}$ 120 going towards $M_m$ 35. The best compromise between required calculation power and quality of the estimation of the quantity of light scattered along a scattering direction is found in this way.

Figure 5:
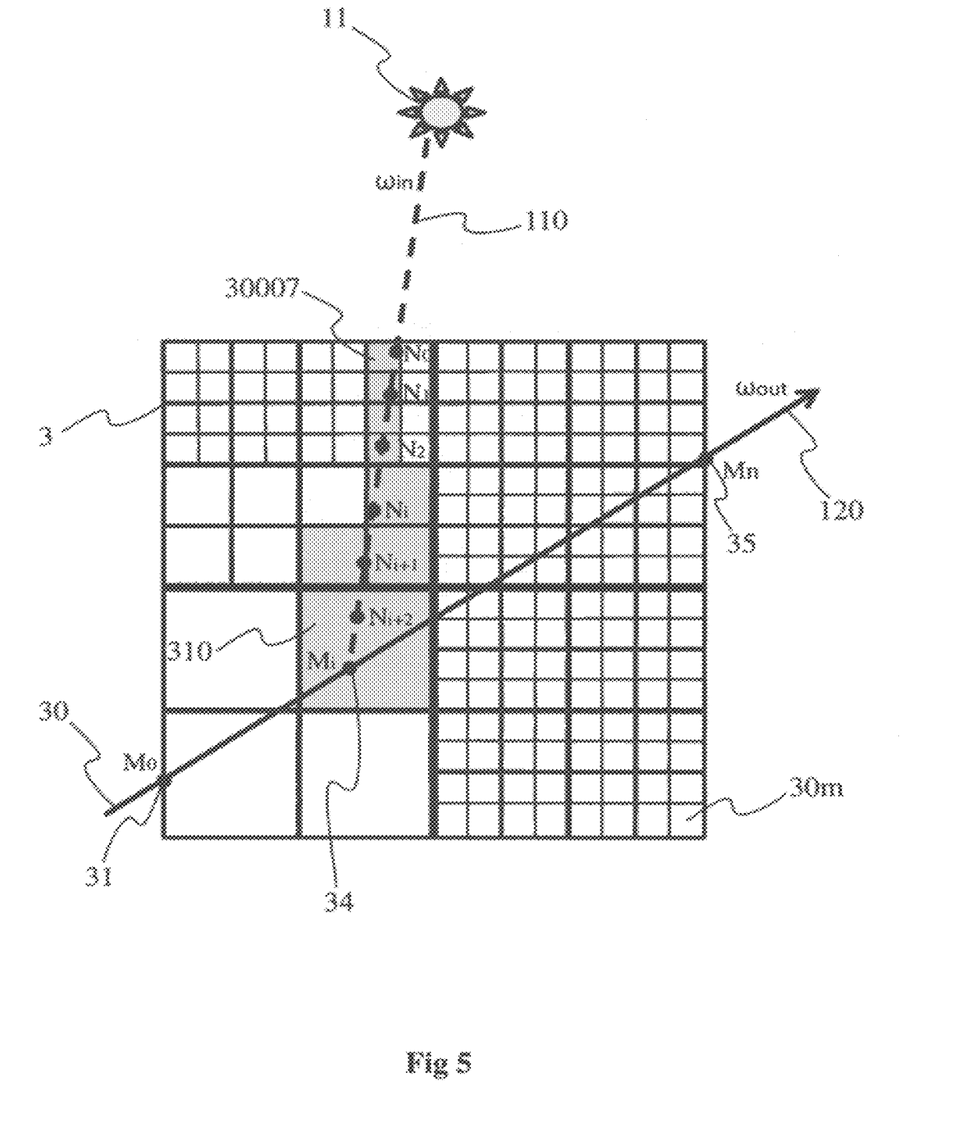
FIG. 5 shows several spatial subdivision levels of a media of FIG. 1 according to an emission direction of the light, according to a particular embodiment of the invention.

FIG. 5 shows the media 2 representative of the heterogeneous participating media 10 with several levels of spatial subdivision along a direction of incident light $\omega_{in}$ 110, according to an embodiment of the invention. As has been described in regard to FIGS. 3A, 3B, 4A and 4B, the quantity of light emitted via the media 2 along the scattering direction (also known as the observation direction) $\omega_{out}$ 120 is realised using the method known as ray-marching. In order to calculate the quantity of light scattered via a point of the scattering direction $\omega_{out}$ 120, for example the point $M_i$ 34, the attenuation of incident light at this point $M_i$ 34 must first be estimated. The estimation of the attenuation of incident light at a point $M_i$ is also carried out using the ray-marching method and the same reasoning as that described in regard to FIGS. 3A, 3B, 4A and 4B is applied to select the optimal spatial subdivision levels along the incident light direction $\omega_{in}$ 110. Initially, the finest level of spatial subdivision, that is to say the lowest hierarchically, is applied to the media 2 along the direction $\omega_{in}$ 110 and the light attenuation at the point $M_i$ along the direction $\omega_{in}$ 110 is estimated using the ray-marching method as described in regard to FIG. 1. This attenuation value represents a first reference value. Then the light attenuation at the point $N_0$ is estimated for the hierarchically lowest level of spatial subdivision then for the level directly above the lowest level. These values are compared with the reference value, that is to say the part that they represent in the total attenuation at the point $M_i$ is extracted and the attenuation estimation error at the point $N_0$ is deduced. If this error is less than a second threshold value, then the highest level of spatial/subdivision of the two (that is to say with the least "voxels") is considered as being sufficient for a good quality estimation of the light attenuation. If this error is greater than a second threshold value, then the highest level of spatial subdivision is not selected as it results in an estimation of the attenuation at the point $N_0$ that is too approximate. The same operations are then carried out successively on the point $N_1$ then $N_2$ then $N_i$ unto arrival at the point $N_i$ for which the highest level of spatial subdivision of the two is sufficient as it results in a lower estimation error in attenuation at this point (or more specifically the attenuation part at this point with respect to the total attenuation at the point $M_i$) than the second threshold value when compared with an estimation done for a finer spatial subdivision. For the points N0 to N2, the lowest level spatial subdivision is selected and for the points Ni and after, up to Mi, the attenuation of incident light is again estimated for two levels of spatial subdivision hierarchically consecutive going back up the octree representation of spatial subdivisions to determine which level of spatial subdivision offers the best compromise between reduction of required calculations and the exactness of the estimation of incident light attenuation in comparison with a second threshold value. Finally the moment arrives where the finest spatial subdivision level is applied for the first points of the incidence direction $N_0$ à $N_2$, then a second level of spatial subdivision directly above the lowest level from a hierarchical point of view is applied for the following points, namely $N_i$ and $N_{i+1}$, then a third level of spatial subdivision directly above the second level for the points following the point $N_{i+1}$ as far as the point $M_i$.

The selection of several layers of spatial subdivision along the direction of incident light $\omega_{in}$ 110 offers the advantage of conserving an estimation of total attenuation of the light at the point Mi with a minimum error, less than a third threshold value for example, while minimising the calculations and optimally reducing the number of "Voxels" crossed by the incident ray $\omega_{in}$ 110, which is the same as reducing the number of points for which the density varies, the complexity of calculations being directly linked to the density variations from one point to another.

Advantageously, the media 2 is lit by more than one light source 11. Each point Mi of the scattering direction $\omega_{out}$ 120 thus receives several incident rays and the quantity of light received by the point $M_i$ corresponds to the sum of quantities of elementary incident light received (that is to say for each ray of incident light). To estimate the attenuation of the light at the point $M_i$ the operations described above are reiterated for each direction of incident light.

Figure 6:
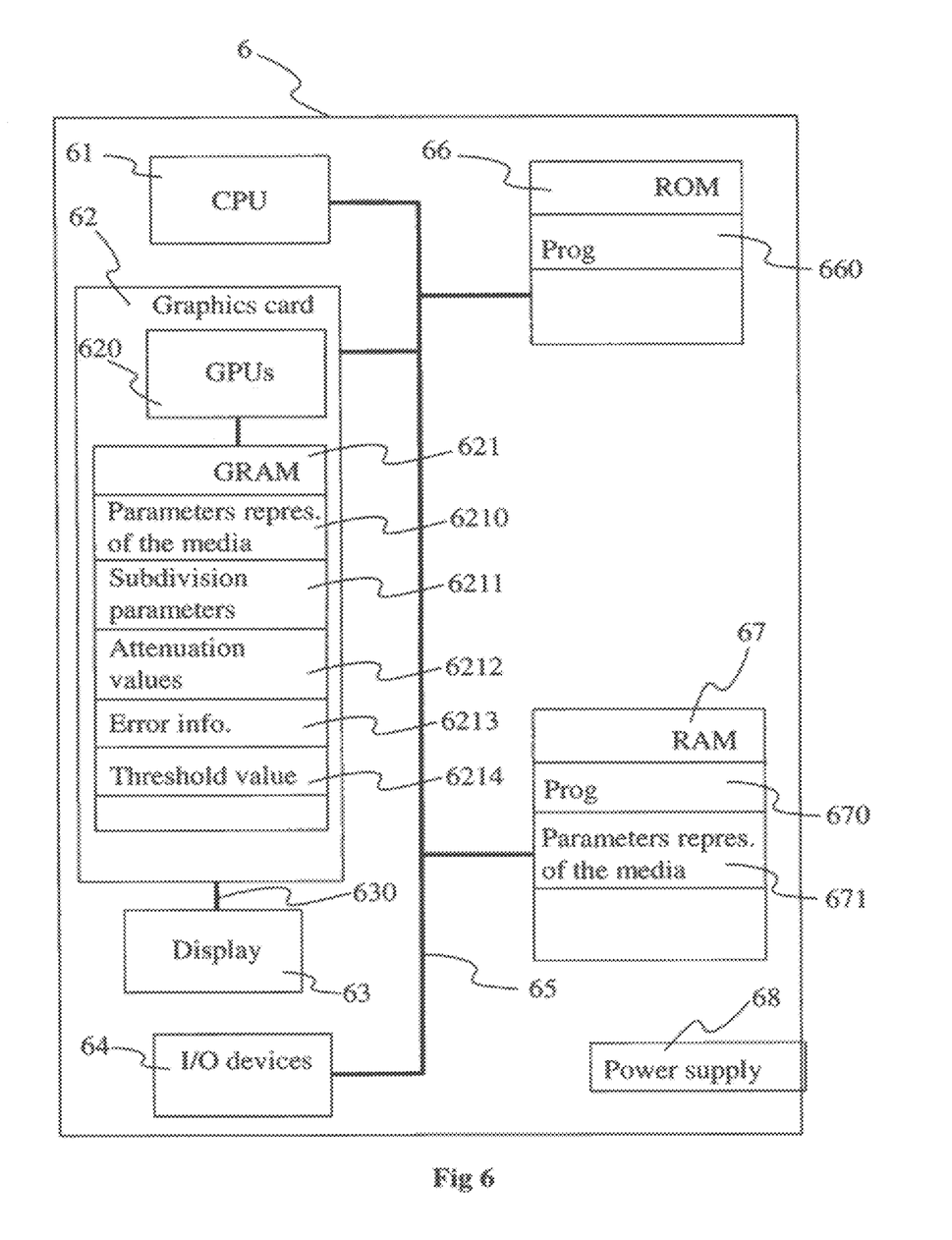
FIG. 6 shows a device implementing a method for estimation of the quantity of light scattered by a media of FIG. 1, according to a particular embodiment of the invention.

FIG. 6 diagrammatically shows a hardware embodiment of a device 6 adapted for the estimation of the quantity of light scattered by a heterogeneous participating media 10 and at the creation of display signals of one or several images. The device 6 corresponding for example to a personal computer PC, a laptop or a games console.

The device 6 comprises the following elements, connected to each other by a bus 65 of addresses and data that also transports a dock signal:
  a microprocessor 61 (or CPU),
  a graphics card 62 comprising:
    several Graphicole Processor Units (or GPUs) 620,
    a Graphical Random Access Memory (GRAM) 621,
  a non-volatile memory of ROM (Read Only Memory) type 66,
  a Random Access Memory or RAM 67,
  one or several I/O (Input/Output) devices 64 such as for example a keyboard, a mouse, a webcam, and
  a power source 68.

The device 6 also comprises a display device 63 of display screen type directly connected to the graphics card 62 to display notably the display of synthesized images calculated and composed in the graphics card, for example live. The use of a dedicated bus to connect the display device 63 to the graphics card 62 offers the advantage of having much greater data transmission bitrates and thus reducing the latency time for the displaying of images composed by the graphics card. According to a variant, a display device is external to the device 6 and is connected to the device 6 by a cable transmitting the display signals. The device 6, for example the graphics card 62, comprises a means for transmission or connection (not shown in FIG. 6) adapted to transmit a display signal to an external display means such as for example an LCD or plasma screen or a video-projector.

It is noted that the word "register" used in the description of memories 62, 66 and 67 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 61 loads and executes the instructions of the program contained in the RAM 67.

The random access memory 67 notably comprises:
  in a register 670, the operating program of the microprocessor 61 responsible for switching on the device 6,
  parameters 671 representative of the heterogeneous participating media 10 (for example parameters of density, of light absorption coefficients, of light scattering coefficients).

The algorithms implementing the steps of the method specific to the invention and described hereafter are stored in the memory GRAM 67 of the graphics card 62 associated with the device 6 implementing these steps. When switched on and once the parameters 670 representative of the media are loaded into the RAM 67, the graphic processors 620 of the graphics card 62 load these parameters into the GRAM 621 and execute the instructions of these algorithms in the form of microprograms of "shades" type using HLSL (High Level Shader Language) language or GLSL (OpenGL Shading Language) for example.

The random access memory GRAM 621 notably comprises:
  in a register 6210, the parameters representative of the media 10,
  spatial subdivision parameters 6211 representative of different spatial subdivision levels of the media 2,
  light intensity attenuation values 6212 for a set of points of the media 2, 10,
  items of error information 6213 representative of the light attenuation difference between two consecutive hierarchic spatial subdivision levels, and
  one or several threshold values 6214.

According to a variant, a part of the RAM 67 is assigned by the CPU 61 for storage of the parameters 6211, the values 6212 and 6214 and the items of error information 6213 if the memory storage space available in GRAM 621 is insufficient. This variant however causes greater latency time in the composition of an image comprising a representation of the media 2, 10 composed from microprograms contained in the GPUs as the data must be transmitted from the graphics card to the random access memory 67 passing by the bus 65 for which the transmission capacities are generally inferior to those available in the graphics card for transmission of data from the GPUs to the GRAM and vice-versa.

According to another variant, the power supply 68 is external to the device 6.

Figure 7:
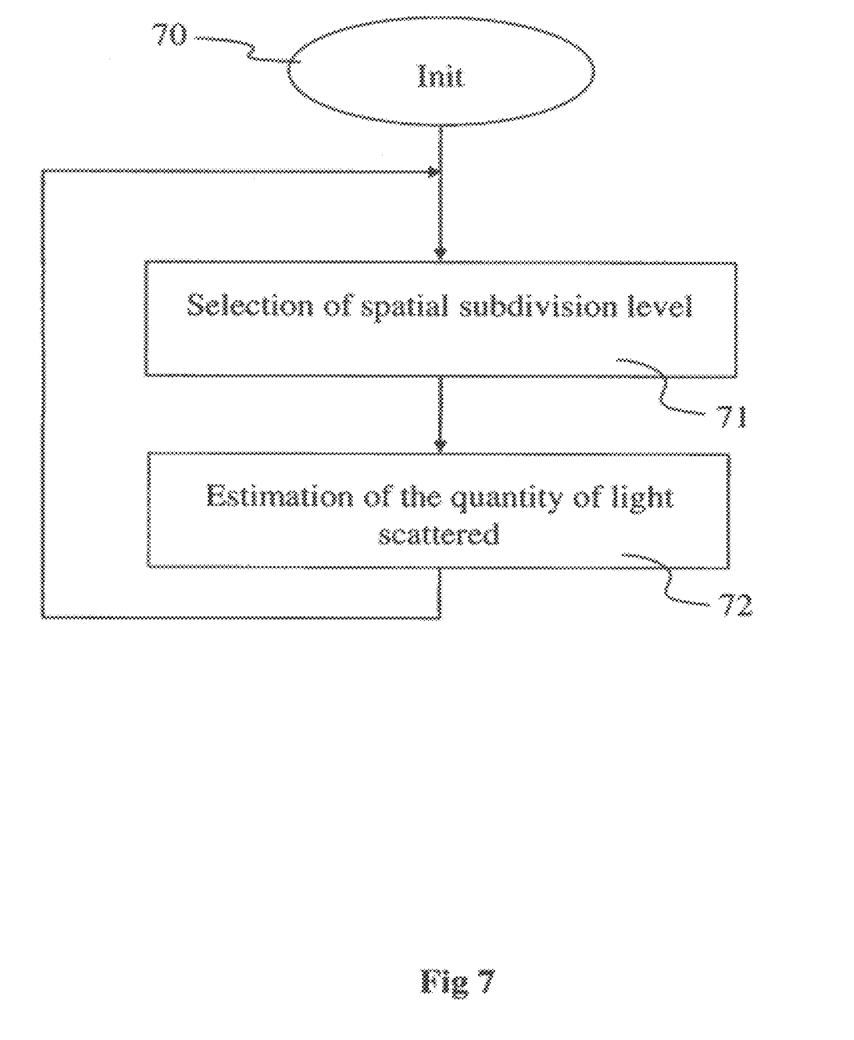
FIG. 7 shows a method for estimation of the quantity of light scattered by a media of FIG. 1, according to a particular embodiment of the invention.

FIG. 7 shows a method for estimation of the quantity of light scattered by a heterogeneous participating media 10 implemented in a device 6, according to a second non-restrictive particularly advantageous embodiment of the invention.

During an initialisation step 70, the different parameters of the device 6 are updated. In particular, the parameters representative of the heterogeneous participating media 10 are initialised in any way.

Then, during a step 71, one or several spatial subdivision levels of the media 2 representing the media 10 are selected along one or several scattering directions $\omega_{out}$ 120 (also called observation directions) and/or along one or several incident light directions (also called light emission directions) $\omega_{in}$ 110. This or these subdivision level(s) are selected from among a plurality of spatial subdivision directions 21 to 24 ordered hierarchically in an octree (or a quarternary tree for a two-dimensional media 2) according to one or several items of information representative of a difference in attenuation of the light in the media 2 between two hierarchically consecutive spatial subdivision levels. Along one light scattering direction $\omega_{out}$, a value representative of the attenuation of the light scattered via the point of intersection between the media 2 and the direction $\omega_{out}$ is estimated for the lowest hierarchical spatial subdivision level of the media 2 (that is to say the finest representation level of the media, that is it say that comprising the greatest number of "voxels"), this value serving as reference value. Then a first value representative of the attenuation of the light scattered via the first point of a set of points of the direction, this set of points corresponding to a sampling of the scattering direction carried out for the application of the ray-marching method, is estimated for the lowest spatial subdivision level. Then, for the same first point, another estimation of a value representative of the attenuation of scattered light is estimated for the spatial subdivision level hierarchically directly above the lowest level. These two first values are compared with the reference value to determine the part (of each of these two first values) of the attenuation of the light of this first point in the total attenuation at the intersection point of the media and the direction $\omega_{out}$. By comparing these two parts in the total attenuation of scattered light, it is thus possible to deduce an item of error information representative of the error induced via the highest spatial subdivision level (the least fine of the two as it comprises less "voxels") in the calculation of the attenuation of the scattered light. According to this error, the adapted spatial subdivision level, that is to say inducing an admissible error, for example invisible to the human eye, for the first point is selected. These operations are reiterated point by point for each sampling point of the scattering direction going into the media 2 in the direction of observation. If for a given point the highest level of the two of spatial subdivision is sufficient, then the level is judged to be sufficient for all the following points. From this given point, the attenuation is estimated for the level directly above the lowest level and for the level directly above this latter to estimate the error that will be induced by the highest level, These operations are reiterated for all the sampling points of the observation direction $\omega_{out}$ until the end limit of the media 2 is reached. Several spatial subdivision layers are advantageously selected along a light scattering direction via the media 2. The same reasoning is applied to the sampling point of an incident light direction, for which the second values representative of the attenuation of the light received from a light source are estimated for two hierarchically consecutive subdivision levels, to select the spatial subdivision levels along the incident light direction for which the errors induced are judged to be acceptable.

According to a variant, the error information, caged first error information, resulting from the comparison of first values representative of light scattered via a sampling point of the scattering direction is compared to a first threshold value, during a comparison step not shown in FIG. 7, in order to select one or other of two hierarchically consecutive spatial subdivision levels for which were calculated the two first attenuation values of scattered light. If the first item of error information is less than a first threshold value, the first hierarchically highest spatial subdivision level is selected, this signifying that the highest level results in an acceptable error in the estimation of light attenuation while the calculation costs are less than those engendered for a lower level, a lower level having more "voxels " in the media and thus more variation in physical characteristics, particularly in the density, of the media 2. If the first error information is greater than the first threshold value, the lowest hierarchical level of spatial subdivision is selected, this signifying that the highest level results in a non-acceptable error, for example visible to the human eye, in the estimation of the attenuation of the light.

According to another variant, the error information, called second error information, resulting from the comparison of second values representative of the attenuation of the light received from a light source at a sampling point of the incident light direction is compared to a second threshold value, during a comparison step not shown in FIG. 7, in order to select one or other of two hierarchically consecutive spatial subdivision levels for which were calculated the two second attenuation values of scattered light. If the second item of error information is less than a second threshold value, the hierarchically highest spatial subdivision level is selected, this signifying that the highest level results in an acceptable error in the estimation of received light attenuation while the calculation costs are less than those engendered for a lower level, a lower level having more "voxels" in the media and thus more variation in physical characteristics, particularly in the density, of the media 2. If the second error information is greater than the second threshold value, the lowest hierarchical level of spatial subdivision is selected, this signifying that the highest level results in a non-acceptable error, for example visible to the human eye, in the estimation of the attenuation of the received light.

Advantageously, the first and second items of error information have different values. According to a variant, the first and second items of error information are of the same value. According to another variant, the first (respectively second) item of error information changes value according to the spatial subdivision levels that are compared.

Then during a step 72, the quantity of light scattered via the media 2 is estimated using a sampling method, advantageously a ray-marching method. Advantageously, the sampling is selected so that there is a sampling point per "voxel" along the scattering direction. According to a variant, the sampling is selected in a way to be finer when the subdivision level is finer and rougher as the subdivision level rises hierarchically. According to another variant, the sampling is regular, that is to say the sampling points are regularly spaced. This last variant in addition is not very costly in terms of calculation as the density does not vary from one point to another of a same "voxel".

Steps 71 and 72 are advantageously reiterated as a spectator 12 moves around the media 10, the image forming the display of the media 10 being recomposed for each elementary displacement of the spectator 12 around the media 10. According to a variant, the step 71 and 72 are reiterated when the conditions of the media environment, particularly when the light source(s) change.

Naturally, the invention is not limited to the embodiments previously described.

In particular, the invention is not limited to a method for estimation of the quantity of light scattered by a heterogeneous participating media but also extends to any device implementing this method and notably any devices comprising at least one GPU. The implementation of equations described with respect to FIGS. 1 to 5 for the estimation of reductions in light intensity in the incidence and emission directions, of the quantity of light scattered is also not limited to an implementation in shader type microprograms but also extends to an implementation in any program type, for example programs that can be executed in a CPU type microprocessor.

The use of the invention is not limited to a live utilisation but also extends to any other utilisation, for example for processing known as postproduction processing in a recording studio for the display of synthesis images for example. The implementation of the invention in postproduction offers the advantage of providing an excellent visual display in terms of realism notably while reducing the required calculation time.

The invention also relates to a method for composition of a video image, in two dimensions or in three dimensions, for which the quantity of light scattered by a heterogeneous participating media is calculated and the information representative of the light that results is used for the displaying of pixels of the image, each pixel corresponding to an observation direction according to an observation direction $\omega_{out}$. The calculated light value for displaying by each of the pixels of the image is re-calculated to adapt to the different viewpoints of the spectator.

The invention also relates to a method for selection of one or several spatial subdivision levels representative of a participating heterogeneous media.

The present invention can be used in video game applications for example, whether via programs that can be executed in a PC or portable type computer or in specialised game consoles producing and displaying images live. The device 6 described with respect to FIG. 6 is advantageously equipped with interaction means such as a keyboard and/or joystick, other modes for introduction of commands such as for example vocal recognition being also possible.

The invention claimed is:

1. A method for calculating the quantity of light scattered by a heterogeneous participating media, wherein the method comprises steps for:
   selecting at least one level of spatial subdivision of said media from among a plurality of hierarchic levels of spatial subdivision according to at least one item of error information representative of an attenuation difference of the light in said media according to at least one direction between two consecutive hierarchic levels,
   calculating the quantity of light scattered by sampling of said media along at least one scattering direction, the sampling being a function of the at least one selected spatial subdivision level.

2. The method according to claim 1, wherein the method comprises a step of calculating at least a first value representative of the attenuation of the light scattered by at least one point of said media situated along said at least one scattering direction.

3. The method according to claim 2, wherein the method comprises a step of calculating at least a second value representative of the attenuation of the light received from at least one light source according to at least one emission direction of the light in said at least one point situated along said at least one scattering direction.

4. The method according to claim 2, wherein the at least one item of error information is determined by comparison of two first values, said two first values being calculated respectively for two consecutive hierarchic spatial subdivision levels of said media.

5. The method according to claim 3, wherein the at least one item of error information is determined by comparison of two second values, said two second values being calculated respectively for two consecutive hierarchic spatial subdivision levels of said media.

6. The method according to claim 1, wherein the method comprises a step of comparison of said error information with a threshold value.

7. The method according to claim 6, wherein the spatial subdivision level selected corresponds to the level of the highest hierarchic position if said at least one item of error information is less than said threshold value.

8. A device configured for the calculation of the quantity of light scattered by a heterogeneous participating media, wherein the device comprises at least a processor configured for:
   selecting at least one level of spatial subdivision of said media from among a plurality of hierarchic levels of spatial subdivision according to at least one item of error information representative of an attenuation difference of the light in said media according to at least one direction between two consecutive hierarchic levels,
   calculating the quantity of light scattered by sampling of said media along at least one scattering direction, the sampling being a function of the at least one selected spatial subdivision level.

9. A non-transitory computer program product, wherein it comprises instructions of program code for executing steps of the method according to claim 1, when said program is executed on a computer.

10. A storage device readable by a computer, storing the instructions of program code executable by said computer for executing steps of the method according to claim 1.

11. The device according to claim 8, wherein the at least a processor is further configured for calculating at least a first value representative of the attenuation of the light scattered by at least one point of said media situated along said at least one scattering direction.

12. The device according to claim 11, wherein the at least a processor is further configured for calculating at least a second value representative of the attenuation of the light received from at least one light source according to at least one emission direction of the light in said at least one point situated along said at least one scattering direction.

13. The device according to claim 11, wherein the at least one item of error information is determined by comparison of two first values, said two first values being calculated respectively for two consecutive hierarchic spatial subdivision levels of said media.

14. The device according to claim 12, wherein the at least one item of error information is determined by comparison of two second values, said two second values being calculated respectively for two consecutive hierarchic spatial subdivision levels of said media.

15. The device according to claim 8, wherein the at least a processor is further configured for comparing said error information with a threshold value.

16. The device according to claim 15, wherein the spatial subdivision level selected corresponds to the level of the highest hierarchic position if said at least one item of error information is less than said threshold value.

* * * * *